HYDROCYANATION OF CONJUGATED DIOLEFINS

William C. Seidel, Orange, Tex., and Chadwick A. Tolman, Wilmington, Del., assignors to E. I. du Pont de Nemours and Company, Wilmington, Del.
No Drawing. Filed Sept. 26, 1973, Ser. No. 401,072
Int. Cl. C07c 121/04
U.S. Cl. 260—464         10 Claims

ABSTRACT OF THE DISCLOSURE

A process for hydrocyanating a conjugated diolefin such as butadiene at a temperature of $-50$ to $150°$ C. in the presence of a $\pi$-allyl nickel catalyst complex to produce mainly 3-pentenenitrile and a lesser amount of 2-methyl-3-butenenitrile. The 3-pentenenitrile can be further hydrocyanated to adiponitrile, an important polyamide intermediate.

BACKGROUND OF THE INVENTION

This invention is concerned with the hydrocyanation of conjugated diolefins in the presence of certain nickel catalyst compounds.

Hydrocyanation of various diolefinic compounds such as butadiene in the presence of certain zerovalent nickel catalysts is described in U.S.P. 3,496,215. As described in that reference, hydrocyanation of butadiene by the process described therein leads to production of a number of products including 3-pentenenitrile which is especially useful in that it can be further hydrocyanated to produce adiponitrile, an important intermediate in polyamide manufacture.

In the further development of hydrocyanation technology for conjugated diolefins improved processes have been sought particularly in respect to their operability under relatively mild conditions.

SUMMARY OF THE INVENTION

It has now been found that conjugated diolefins such as butadiene can be hydrocyanated to organic nitrile compounds under relatively mild conditions in the presence of a $\pi$-allyl nickel catalyst. The $\pi$-allyl nickel catalyst consists essentially of a complex of the formula

wherein $R^1$ to $R^5$ are of the group consisting of hydrogen and alkyl radicals having from one to nine carbon atoms, at least one of $R^1$, $R^2$, $R^4$ and $R^5$ being an alkyl radical, wherein a pair of alkyl radicals may be cojoined to form an alkylene radical, which radical together with the allyl group forms cycloaliphatic ring having from five to eight carbon atoms, wherein PXYZ is a sigma-pi bonding ligand in which X is OR, Y and Z are R or OR and R is an alkyl or aryl radical having up to 18 carbon atoms, wherein the R radicals of a given ligand are so chosen that the ligand has a cone angle of $130°$ to $170°$, wherein "$a$" has a value of 1, "$m$" has a value of 1–2 and "$n$" has a value of 1.

Specific ligands of the type PXYZ having a cone angle of between $130°$ and $170°$ include tri-o-tolyl phosphite ($141°$), di-o-tolylphenyl phosphonite ($142°$) and tri-(2,5-xylyl)phosphite ($144°$). Other suitable phosphorus ligands include tri-(2,4-xylyl)phosphite, tri-(o-phenylphenyl)-phosphite, diphenylphenyl phosphonite and phenyl diphenyl phosphinite. The cone angle is determined as described by C. A. Tolman, J. Am. Chem. Soc. 92, 2956 (1970). The aryl groups of PXYZ may be substituted with alkoxy or other groups provided the groups do not interfere with the catalyst function. Mixed phosphorus ligands can be used.

The catalyst compounds described above can be conveniently formed in situ, for example, by feeding into a reactor the conjugated diolefin such as butadiene, hydrogen cyanide and an N-bonded nitrile complex such as $Ni(PXYZ)_3 \cdot (NCR^6)$ wherein $R^6CN$ is an organic nitrile such as 3-pentenenitrile, 2-methyl-3-butenenitrile, acetonitrile, benzonitrile, methylglutaronitrile 3-cyanocyclopentene or adiponitrile. The $\pi$-allyl nickel complex forms rapidly and is the active catalyst species for the hydrocyanation reaction. The N-bonded nitrile complex can be prepared by contacting $Ni(PXYZ)_3$ with an appropriate organic nitrile as described by C. A. Tolman, Inorg. Chem. 10, 1540 (1971). Alternately, it can be prepared by contacting, in situ if desired, nickel chloride with an organic nitrile such as 3-pentenenitrile or 2-methyl-3-butenenitrile, a triaryl phosphorus compound such as tri-o-tolyl phosphite, a promoter such as ammonia or an ammonium halide and a finely-divided reducing metal such as zinc. The zinc halide present in the reduction mixture containing the nickel complex can be removed by precipitation with anhydrous ammonia.

The hydrocyanation reaction can be carried out by charging a reactor with all of the reactants or the reactor can be charged with the catalyst or catalyst components, the butadiene and a solvent if used and hydrogen cyanide gas is swept over the surface of the reaction mixture or is bubbled through the reaction mixture. Alternately, the hydrogen cyanide may be introduced in liquid form or in the form of the corresponding cyanohydrin. Another technique is to charge the reactor with catalyst, hydrogen cyanide and solvent to be used and thereafter feed the conjugated diolefin slowly to the reaction mixture. The mole ratio of diolefin to catalyst generally is varied from about 1:2 to 2000:1 for batch or continuous operations. The reaction medium is generally agitated, for example, by stirring or shaking, and the desired products can be recovered by conventional techniques such as distillation or membrane separation.

The hydrocyanation reaction can be carried out as a temperature in the range of $-50°$ C. to $150°$ C., preferably $-15°$ C. to $100°$ C., at atmospheric or superatmospheric pressures.

It may be of advantage to employ an excess of the PXYZ ligand over that required in the catalyst compound. The excess ligand may be added to the catalyst compound already formed in the reactor or preceding catalyst preparation. In general, at least a one-mole excess of the ligand can be used and amounts of 30 moles excess or more may be used, the top limit being dictated mainly by economic considerations.

The hydrocyanation reaction can be carried out with or without a solvent. The solvent should be liquid at the reaction temperature and inert toward the reactants and catalyst. Typical satisfactory solvents include hydrocarbons such as benzene, toluene or the xylenes, or organic nitriles such as acetonitrile or benzonitrile. The nitrile products formed in the reaction as well as the excess PXYZ ligands discussed above, can also serve as solvents.

Conjugated diolefins which can be hydrocyanated by the process of this invention may contain from 4 to 12 carbon atoms and include such compounds as butadiene, piperylene, 1,3-hexadiene, isoprene, 2,3-dimethyl-1,3-butadiene, cyclo-1,3-pentadiene, cyclo-1,3-hexadiene and cyclo-1,3-octadiene. The term butadiene, referred to in the examples and throughout the specification is intended to mean 1,3-butadiene.

The nitriles formed by the present invention are useful as intermediates. For instance, 3-pentenenitrile produced in the reaction can be further hydrocyanated to adiponitrile, which in turn can be converted to hexamethylenediamine for the production of polyamides for fibers, films and molded articles.

DESCRIPTION OF PREFERRED EMBODIMENTS

The preferred embodiments of this invention are illustrated in the examples to follow. Analysis of reaction products was carried out by gas chromatography. Gas chromatographic data expressed in area percent are approximations of weight percent. See Purnell *Gas Chromatography*, John Wiley & Sons (1962) page 285. The reactions in all cases were carried out in a nitrogen atmosphere or in an apparatus well purged with nitrogen.

Example 1.—Batch Hydrocyanation of Butadiene

A high pressure NMR tube[1] was charged with 40 μl. of a solution of Ni(o-TTP)$_3$·3PN[2] in 3-pentenenitrile (1.76% Ni(O)), 90 μl. of tri-*o*-tolylphosphite and 400 μl. of an HCN/butadiene (1:2 molar) solution and heated to 80° C. in an NMR spectrometer. Analysis as a function of time showed the formation of 3-pentenenitrile (3 PN) and 2-methyl-3-butenenitrile (2M3BN) in a mole ratio of 2:1 3PN to 2M3BN. After approximately 4½ hours about 60% of hydrogen cyanide had been consumed.

Example 2.—Batch Hydrocyanation of Butadiene

A high pressure NMR tube was charged with 20 μl. of a solution of Ni(o-TTP)$_3$·3PN[2] in 3PN (10 g. in ml. of 3PN), 90 μl. of o-TTP[3] and 375 μl. of HCN/butadiene solution (1:1) prepared by contacting Ni(o-TTP)$_3$ with 3PN following the method described by C. A. Tolman, *Inorg. Chem.* 10, 1504 (1971). An alternate method involves reduction of nickel chloride with zinc in a mixture of triarylphosphite and 3PN with ammonia or ammonium halide as promoter. In an illustrative preparation 2.63 g. of NiCl$_2$ was contacted under nitrogen with 1.43 g. of finely-divided zinc in 32 g. of tri-*o*-tolyl phosphite and 88 g. of 3 PN along with 0.22 g. of ammonia as promoter. After two hours at 80° C. a 55.5% conversion to the nickel complex was obtained. By-product ZnCl$_2$ was removed by precipitation with gaseous ammonia and heated to 80° C. in an NMR spectrometer. Analysis as a function of time showed the steady formation of 3PN and 2M3BN in a weight ratio of 2:1. At the conclusion of the run (about 4½ hours) the tube was opened; analysis by gas chromatography also showed production of 3PN and 2M3BN, respectively, in weight ratio of 2:1.

Example 3.—Continuous Hydrocyanation of Butadiene

A reactor was fed in continuous fashion with good mixing the following materials:

| Feed | Rate, pounds/hour |
|---|---|
| HCN | 0.350 |
| Butadiene | 0.853 |
| Catalyst solution | 3.482 |

---
[1] Tube used in nuclear magnetic resonance determination.
[2] Ni(o-TTP)$_3$·3PN
 =Ni[P(O-*o*-C$_6$H$_4$CH$_3$)$_3$]$_3$[NC—CH$_2$—CH=CH—CH$_3$]$_3$.
[3] o-TTP=P(O-*o*-C$_6$H$_4$CH$_3$)$_3$.

The catalyst solution (Ni(o-TTP)$_3$·3PN in 3PN) contained 0.12% Ni(O), 77% o-TTP, and 15% 3PN). The reaction temperature was 60° C. and the pressure was 100 p.s.i.g. Analysis of the feed and product streams by gas chromatography indicated a yield to useful products (3PN and 2M3BN) of 96.7%.

Example 4.—Hydrocyanation of Cyclopentadiene

Into a reaction maintained at 60° C. and containing a catalyst solution consisting of 2.1 g. of tris(tri-o-tolyl phosphite) nickel acetonitrile, 6.6 g. of tri-o-tolyl phosphite and 3 g. of acetonitrile there was fed cyclo-1,3-pentadiene at a rate of 10 ml. per hour (0.12 mole/hour) and hydrogen cyanide at a rate of 4.6 ml. per hour (0.12 mole/hour). After three hours the reaction mixture was distilled at 91° C. and 50 torr. to give 16 ml. of mixture of cyanocyclopentenes, corresponding to a 52% yield. Analysis by gas chromatography and infrared coupled with mass spectroscopy showed the composition of the product to be 5% of 1-cyano-cyclopentene, 45% of 2-cyanocyclopentene and 50% of 3-cyanocyclopentene.

We claim:

1. A process of hydrocyanating a hydrocarbon conjugated diolefin having from 4 to 12 carbon atoms which comprises contacting the diolefin with hydrogen cyanide at a temperature in the range of −50° C. to 150° C. in the presence of a catalyst consisting essentially of a π-allyl nickel complex of the formula

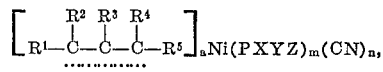

wherein $R^1$ to $R^5$ are of the group consisting of hydrogen and alkyl radicals having from one to nine carbon atoms, at least one of $R^1$, $R^2$, $R^4$ and $R^5$ being an alkyl radical, wherein a pair of alkyl radicals may be cojoined to form an alkylene radical, which radical together with the allyl group forms a cycloaliphatic ring having from five to eight carbon atoms,
wherein PXYZ is a sigma-pi bonding ligand in which X is OR, Y and Z are R or OR and R is an aryl radical or an alkyl hydrocarbyl radical having up to 18 carbon atoms and the R radicals of a given ligand are so chosen that the ligand has a cone angle of 130° to 170°,
wherein "a" has a value of 1, "m" has a value of 1–2, and "n" has a value of 1.

2. The process of Claim 1 wherein the hydrocyanation is carried out at a temperature in the range of −15° C. to 100° C.

3. The process of Claim 2 wherein at least one mole excess of PXYZ is used over that required for the π-allyl nickel complex.

4. The process of Claim 3 wherein PXYZ is tri-*o*-tolyl phosphite.

5. The process of Claim 4 wherein the conjugated diolefin is 1,3-butadiene.

6. The process of Claim 4 wherein the conjugated diolefin is cyclo-1,3-pentadiene.

7. A process of hydrocyanating a hydrocarbon conjugated diolefin having from 4 to 12 carbon atoms which comprises introducing into a reactor maintained at a temperature in the range of −50° C. to 150° C. and into which the conjugated diolefin is also being introduced, an N-bonded nitrile complex of the formula Ni(PXYZ)$_3$(NCR$^6$)

wherein PXYZ is a sigma-pi bonding ligand in which X is OR, Y and Z are R or OR and R is an aryl radical or an alkyl hydrocarbyl radical having up to 18 carbon atoms, wherein the R radicals of a given ligand are so chosen that the ligand has a cone angle of 130° to 170°, wherein R$^6$CN is an organonitrile of the group consisting of 3-pentenenitrile, 2-methyl-3-butenenitrile, acetonitrile, benzonitrile, adiponitrile, 3-cyanocyclo pentene or methylglutaronitrile, the mole ratio of conjugated diolefin to N-bonded nitrile complex being in the range of 1:2 to 2000:1.

8. The process of Claim 7 wherein the reaction is carried out at a temperature in the range of −15° C. to 100° C.

9. The process of Claim 8 wherein at least a one mole excess of ligand PXYZ is used over that required in the N-bonded nitrile complex.

10. The process of Claim 9 wherein PXYZ is tri-o-tolyl phosphite and $R^6$CN is 3-pentenenitrile.

References Cited
UNITED STATES PATENTS 3,773,809  11/1973  Walter ......... 260—465.8 R JOSEPH P. BRUST, Primary Examiner U.S. Cl. X.R.

260—465.3